United States Patent [19]

Wang et al.

[11] Patent Number: 5,790,250
[45] Date of Patent: Aug. 4, 1998

[54] APPARATUS AND METHOD FOR REAL-TIME SPECTRAL ALIGNMENT FOR OPEN-PATH FOURIER TRANSFORM INFRARED SPECTROMETERS

[75] Inventors: C. David Wang, Melville, N.Y.; Robert Howard Kagann, Cumming, Ga.

[73] Assignee: AIL Systems, Inc., Deer Park, N.Y.

[21] Appl. No.: 743,295

[22] Filed: Nov. 4, 1996

[51] Int. Cl.⁶ ............................................. G01B 9/02
[52] U.S. Cl. ............................. 356/346; 356/345
[58] Field of Search ................... 356/345, 358, 356/356, 346

[56] References Cited

U.S. PATENT DOCUMENTS 5,247,342  9/1993  Tamura et al. ..................... 356/346
5,563,982  10/1996  Wang et al. .

OTHER PUBLICATIONS

Douglas, F. Elliot, *Handbook of Digital Signal Processing Engineering Applications*, 234–245, 633–673 (1987).

David M. Haaland and Robert G. Easterling, *Application of New Least-squares Methods for the Quantitative Infrared Analysis of Multicomponent Samples*, 665–673, Applied Spectroscopy vol. 36, No. 6, (1982).

C. David Wang, *Comparison of Phase Error Correction Techniques for Fourier Transform Spectrometers*, 3–17 to 3–26 Topics in Engineering, vol. VII (1996).

Primary Examiner—David C. Nelms
Assistant Examiner—Robert Kim
Attorney, Agent, or Firm—Hoffmann & Baron, LLP

[57] ABSTRACT

An improved open-path fast Fourier infrared spectrometer includes a circuit or algorithm which performs real-time, spectral alignment on measured interferograms to reduce measurement errors. The improved spectrometer measures selected water vapor lines in a measurement path and compares the centerline of these measured water vapor lines to a reference library. From two or more such comparisons within the spectrometer bandwidth, the spectrometer calculates correction factors for the entire bandwidth. The improved spectrometer performs an overlap and add algorithm which applies the correction factors to perform bandwidth segment-specific shifts on subsequently measured interferograms.

10 Claims, 11 Drawing Sheets

5,790,250

APPARATUS AND METHOD FOR REAL-TIME SPECTRAL ALIGNMENT FOR OPEN-PATH FOURIER TRANSFORM INFRARED SPECTROMETERS

BACKGROUND OF THE INVENTION

1. Field of the Invention

The present invention relates to Fourier transform infrared (FTIR) spectrometers and more particularly to a method and apparatus for improving the sensitivity of an FTIR spectrometer by performing real-time spectral shifts on measured data based on the centerline position of known elements in the environment.

2. Description of the Prior Art

FTIR spectrometers are well known in the prior art. A typical FTIR spectrometer based on a Michelson interferometer is illustrated in FIG. 1. Typically, such FTIR systems have been used in a laboratory setting under controlled conditions to make qualitative measurements based on spectral signature analysis. However, within the last two decades, the FTIR spectrometer has been used to perform quantitative analysis of elements in an open and uncontrolled atmosphere. Such "open-path" applications include industrial monitoring of pollutants from a smoke stack and military monitoring of chemicals used in war zones. However, once the controlled environment of the laboratory is left behind, variables within the measurement path must be neutralized in order to achieve accurate results.

In the FTIR spectrometer of FIG. 1, an infrared source 2 reflecting or emitting from a sample to be analyzed is directed onto a semitransparent optical beam splitter 4. The beam splitter 4 reflects approximately half (some loss due to losses in the beam splitter) of the infrared signal to a moving mirror 6 and transmits the remaining half of the signal to a fixed mirror 8. The moving mirror 6 is orthogonally aligned to the fixed mirror 8 and the beam splitter 4 is interposed between the mirrors at a 45° angle. The signals reflected off the fixed mirror 8 and the moving mirror 6 are combined by the beam splitter 4 and are reflected onto a detector 10. As the moving mirror 6 travels in a reciprocating fashion on a line parallel to the fixed mirror 8, the pathlength of the signals reflected by the moving mirror 6 varies. This creates a shift in the relative phase angles of the signals being combined by the beam splitter 4. This combination results in both constructive and destructive interference at the detector 10. This interference creates a position versus magnitude signal known as an interferogram. The detector 10 translates the optical interferogram into an analog voltage which is received by an analog to digital (A/D) converter 12. The A/D converter 12 creates a digital signal representing the detected optical interferogram signal. The digital signal from the A/D converter 12 is coupled to a computer 14 for digital signal processing to determine the concentration level of chemical species in the atmosphere. A helium-neon (HE-NE) laser 16 is used as a signal source for a secondary interferometer 18 to generate a single frequency sinusoidal time reference. The time reference from the HE-NE laser 16 is received by the A/D converter 12 and functions as a synchronizing clock for the A/D converter 12.

The operation of a traditional FTIR spectrometer is illustrated in the block diagram/flow chart of FIG. 2. This figure begins with an illustration of the previously described interferogram 20. The computer 14 is used to perform a fast Fourier transform (FFT) 22 which translates the time domain interferogram of block 20 into a frequency domain, single-beam spectrum 24. From the single beam spectrum 24, both a background spectrum (baseline spectrum) 26 and analytical spectrum 28 are derived. From the background and analytical spectra, a transmission spectrum 30 is calculated by dividing the analytical spectrum by the background spectrum. Finally, an absorption spectrum 32 is calculated as the negative logarithm of the transmission spectrum.

The background spectrum 26 is required to reduce baseline variations which can contribute to errors in open-path, centerline measurements. The background spectrum 26 is used to convert the subsequent analytical spectra 28 into compensated absorption spectra 32. This eliminates spectral distortions which may result from the characteristics of the source 2, beam splitter 4, detector 10, and interfering components within the measurement atmosphere. Ideally, the background spectrum 26 would be acquired by sampling the target atmosphere at a time when the target gas to be measured is not present. However, in an open-path system, this is not always possible and indirect background spectrum generation techniques are required. One such technique is known as synthetic background spectrum generation. In this method, a background spectrum 26 is created by taking samples of the original spectrum at points where no components are expected, then generating a curve to fit these sample points. A suitable curve fitting function is the polynomial defined by $$y = ax^2 + bx + c$$

where a, b, and c are coefficients to be calculated based on a least squares curve fitting algorithm.

As previously mentioned, open-path measurements are subjected to variables not encountered in a laboratory setting. One such variable in open-path FTIR measurement is referred to as "wave number shift." A spectrometer works on the principle that a given chemical species has a spectral signature having components at predetermined wavelengths. To identify and quantify specific elements, the output of the spectrometer is evaluated at those characteristic wavelengths. A typical evaluation method requires direct subtraction of the measured samples against a known reference signal. If, because of environmental and/or measuremental variables, the wavelength of the components of the measured sample does not match that of the reference spectrum, errors in analysis will occur. FIG. 3 illustrates the typical output that results when direct subtraction is performed between a wave number shifted measured signal and a non-shifted reference signal. As FIG. 3 clearly shows, a wave number shift results in a non-zero differential error when the shifted and non-shifted signals are subtracted. Previously, operators of a spectrometer would manually compensate for these wave number shifts by performing off-line compensation of measured signals.

OBJECTS AND SUMMARY OF THE INVENTION

It is an object of the present invention to provide a method and apparatus for improving the sensitivity of an FTIR spectrometer by automatically aligning the spectral components of the analytical and background spectra in real-time to compensate for wave number shifts relative to a known reference spectrum.

It is another object of the present invention to provide a method and apparatus to reduce the differential error occurring in an FTIR spectrometer by automatically aligning the spectral components of the analytical and background spectra in real-time to compensate for wave number shifts relative to a known reference spectrum.

It is yet another object of the present invention to align the wave number of measured data in an FTIR spectrometer by sampling known line spectra and comparing those spectra against reference spectra to determine the magnitude of the required shifts at discrete points within the bandwidth of the spectrometer.

It is still another object of the present invention to perform corrective real-time wave number shifts in an FTIR spectrometer by sampling known line spectra and comparing the sampled line spectra against reference spectra to determine the magnitude of the required shifts at discrete points within the bandwidth of the spectrometer and use these points to estimate correction factors across the full bandwidth of the spectrometer.

It is yet another object of the present invention to perform corrective real-time wave number shifts in an FTIR spectrometer by sampling water vapor lines and comparing the sampled peak of the water lines against a reference peak for these water vapor lines to determine the magnitude of the required shifts at discrete points within the bandwidth of the spectrometer, and then use these points to estimate correction factors across the full bandwidth of the spectrometer.

It is still another object of the present invention to perform real-time wave number shifts in an FTIR spectrometer by using a fast Fourier transform to find the peaks in known line spectra and then compare these peaks to a reference signal to calculate coefficients for use in an overlap and add convolution function to shift the measured spectra.

In accordance with one form of the present invention, an FTIR spectrometer includes a digital signal processor capable of measuring known chemical elements in an environment and calculating a wave number shift compensation equation across the bandwidth of the FTIR spectrometer. From this compensation equation, discrete correction factors will be determined. The preferred elements used to determine the correction factors are water line vapors occurring at 784.46, 1014.47, 2663.29 and 4181.48 $cm^{-1}$. The digital signal processor compares the wavelength of these elements to the expected wavelength for these elements which is stored in a reference library memory circuit. From this comparison, the wave number shift required for subsequent measurements at or near these points is determined and coefficients for digital filters to perform these shifts are calculated and stored in a look-up table memory circuit. Subsequent measured data is partitioned into small data segments. Each segment is processed in real-time by the digital signal processor which performs an overlap and add convolution function. The overlap and add convolution function applies a selected set of filter coefficients to each data segment then recreates the full data stream with the required wave number shifts applied. This processed data stream is then analyzed using a classical least squares regression analysis technique to calculate the concentration of various elements in the measurement path.

A preferred form of the FTIR spectrometer, as well as other embodiments, objects, features and advantages of this invention, will be apparent from the following detailed description of illustrative embodiments thereof, which is to be read in connection with the accompanying drawings.

DETAILED DESCRIPTION OF THE PREFERRED EMBODIMENTS

Figure 1:
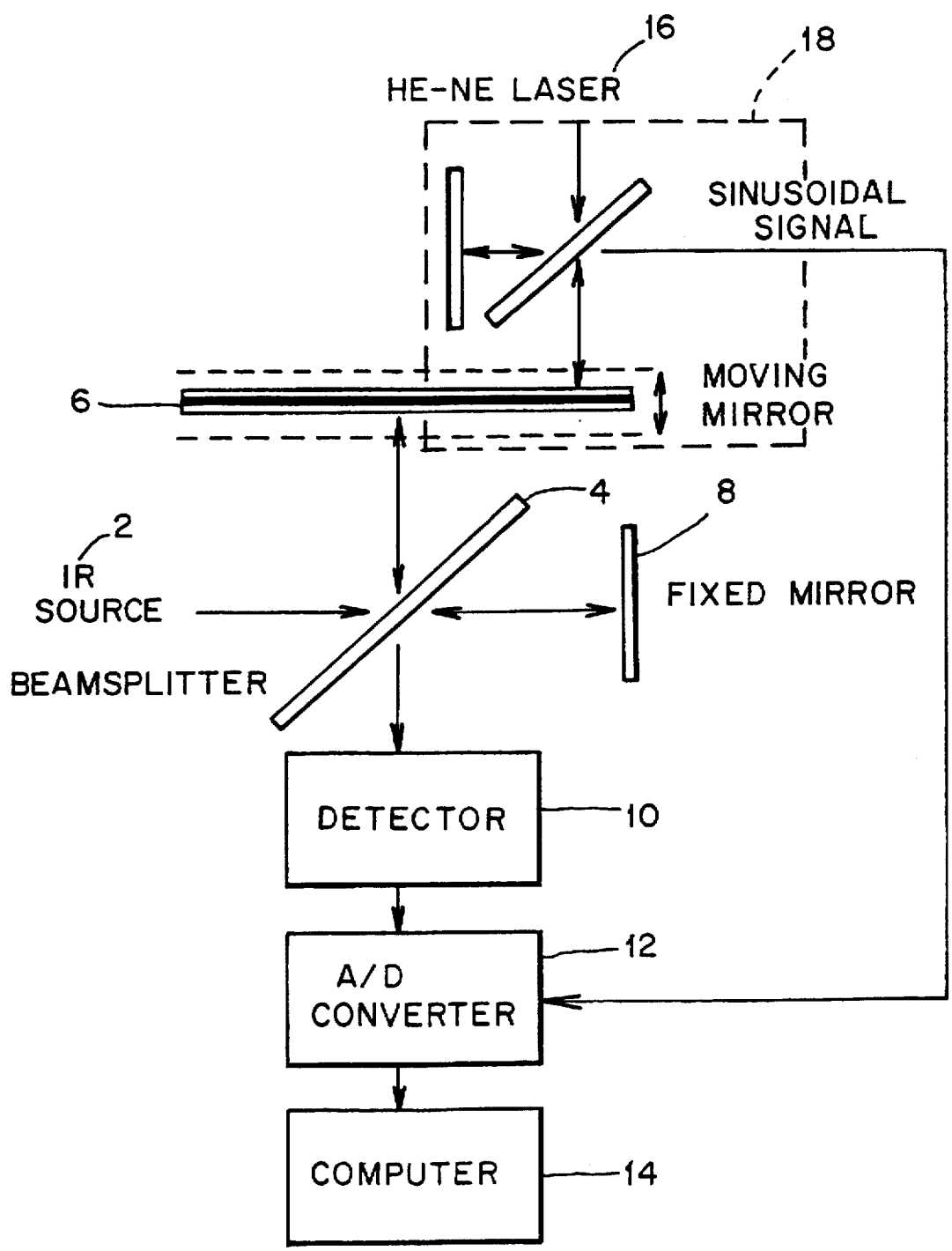
FIG. 1 is a block diagram of an FTIR spectrometer known in the prior art.
Figure 2:
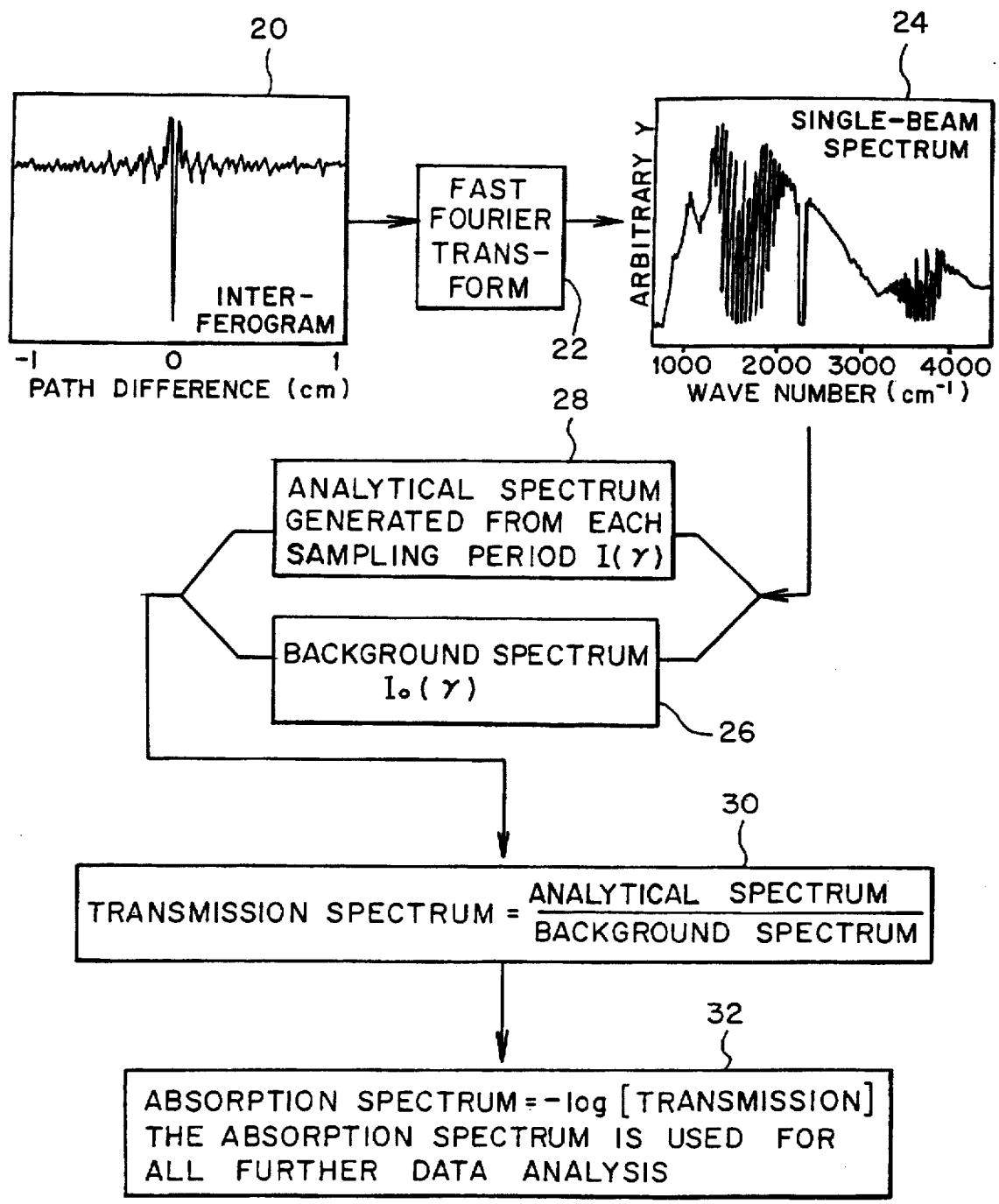
FIG. 2 is a flow chart showing the operation of the FTIR spectrometer known in the prior art.
Figure 3:
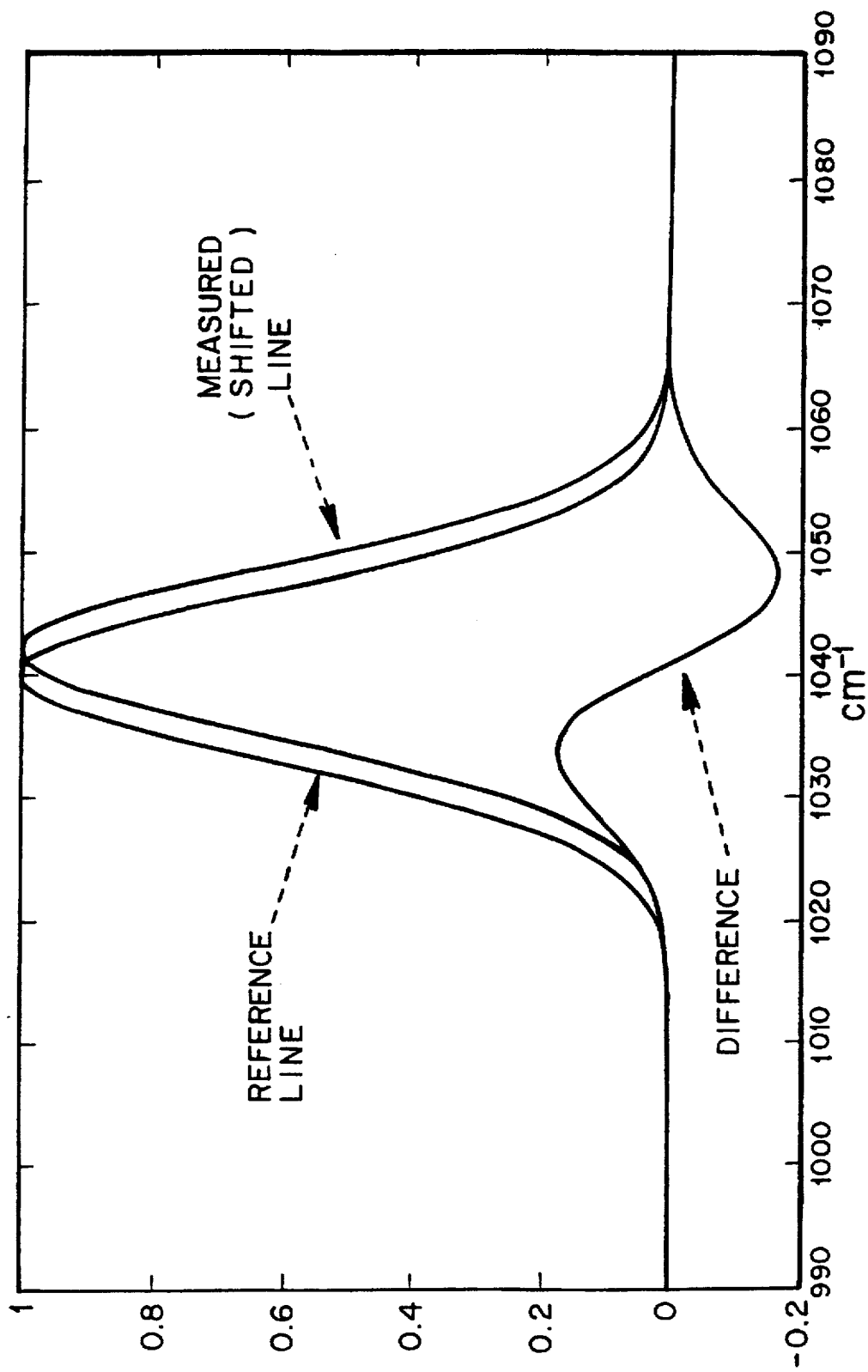
FIG. 3 is a spectral graph of magnitude versus wavelength which illustrates the analysis error that occurs between a shifted measured line and a reference line.
Figure 4:
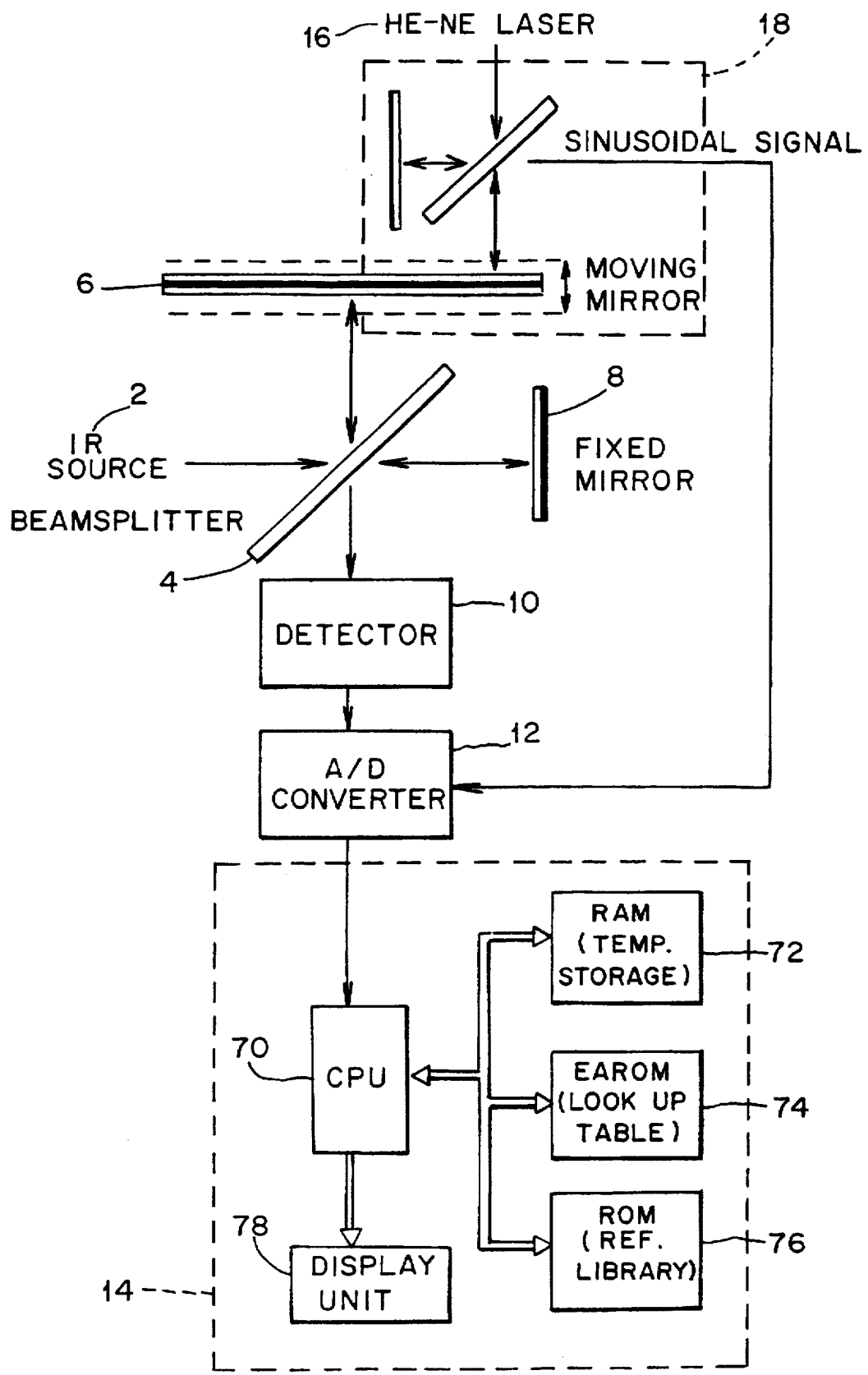
FIG. 4 is a block diagram of an FTIR spectrometer formed in accordance with the present invention.

FIG. 4 illustrates a block diagram of an FTIR spectrometer implementing the present invention. This topology is similar to that of FIG. 1 and includes all of the components of the conventional system; however, the computer 14 is further illustrated with the elements preferred to implement the improved digital signal processing algorithms of the present invention. These elements include a central processing unit (CPU) 70, which is electrically connected to a random access memory (RAM) 72, electrically alterable read only memory (EAROM) 74 and read only memory (ROM) 76. A display 78 is also operatively coupled to the CPU 70 to provide a visual or printed display of the output data. Alternatively, the output data may be ported to another processing unit or computer for further processing or storage.

Figure 5:
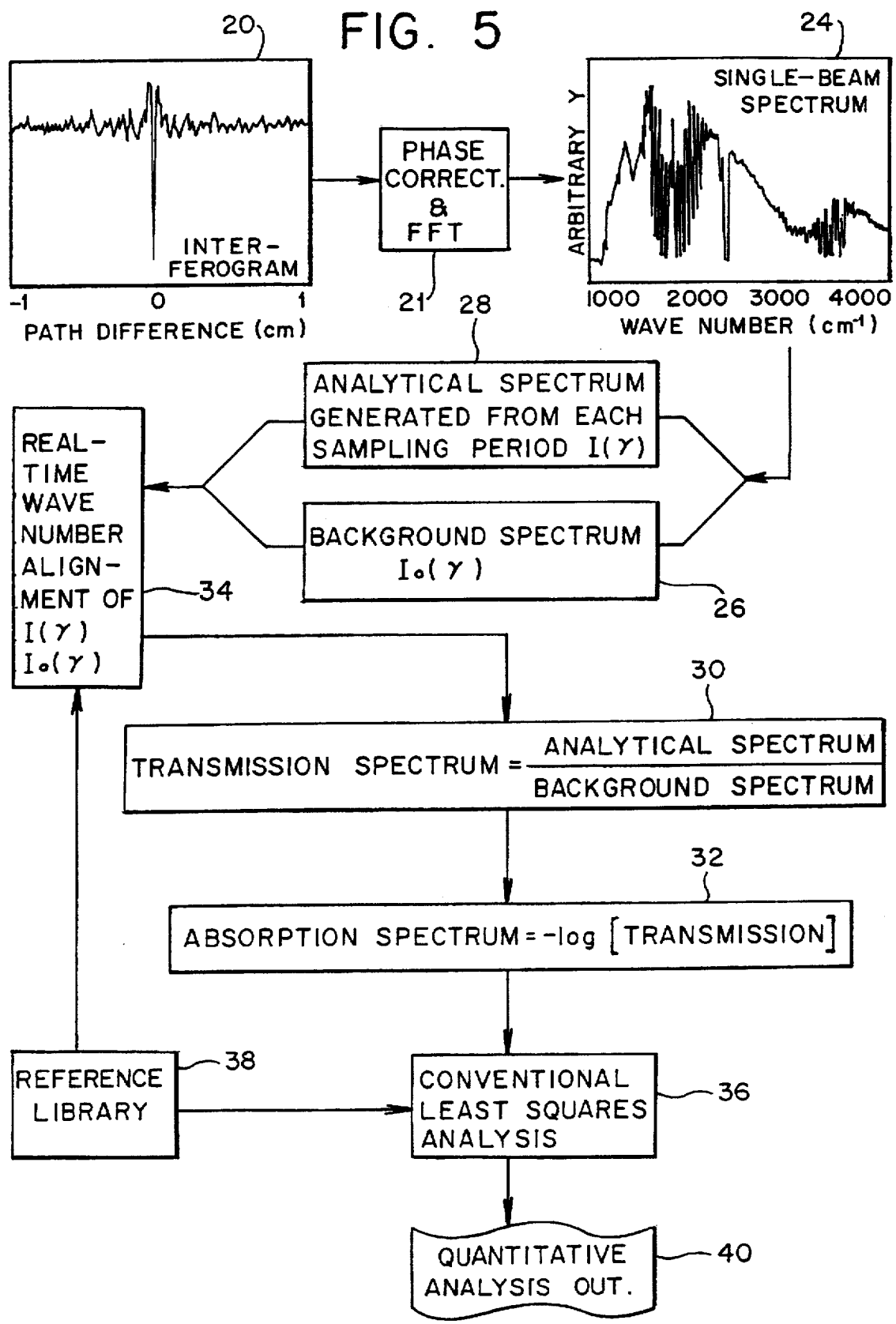
FIG. 5 is a functional diagram/flow chart of the operation of an improved FTIR spectrometer formed in accordance with the present invention.

FIG. 5 illustrates the operation of an FTIR spectrometer in accordance with the present invention. In the preferred embodiment, the FFT (block 22) of the prior art is replaced with a phase correction and FFT (block 21). In this block, the computer 14 receives the digitally sampled interferogram from the A/D converter 12 and performs a "Forman" phase error correction to this signal. The result is a phase corrected single beam spectrum as shown in block 24. The phase correction process reduces spectral distortions and errors in concentration measurements due to off-center and, therefore, asymmetrical, interferogram data. The "Forman" phase correction process is discussed in depth in the article "Correction of Asymmetric Interferograms Obtained in Fourier Spectroscopy," by M. L. Forman et al in the Journal of the Optical Society of America, Vol. 56, No. 1, published in January, 1966, which is incorporated by reference.

One of the important improvements in the present invention over the prior art is the inclusion of a frequency alignment step (block 34) interposed between the steps of generating the analytical and background spectra and calculating the transmission spectrum (block 30). The operation of the real-time frequency alignment algorithm of block 30 is further illustrated in the flow chart of FIG. 6. This frequency alignment algorithm is illustrated with two functional paths. The first path is a compensation-calculation path which is performed periodically. The second path is a compensation-application path which is performed on all subsequently measured spectral data.

The compensation-calculation path must be performed prior to measuring and analyzing the experimental data.

Initially, a first component which is "universally present" (i.e., water vapor lines, carbon dioxide) in the expected measurement path is chosen (block 50). The component chosen should exhibit significant signal strength and preferably consist of a single discrete spectral line. The water vapor line occurring at 1014 cm$^{-1}$ is well suited for this purpose. The wavelength of this first selected component is measured (block 52).

Figure 6:
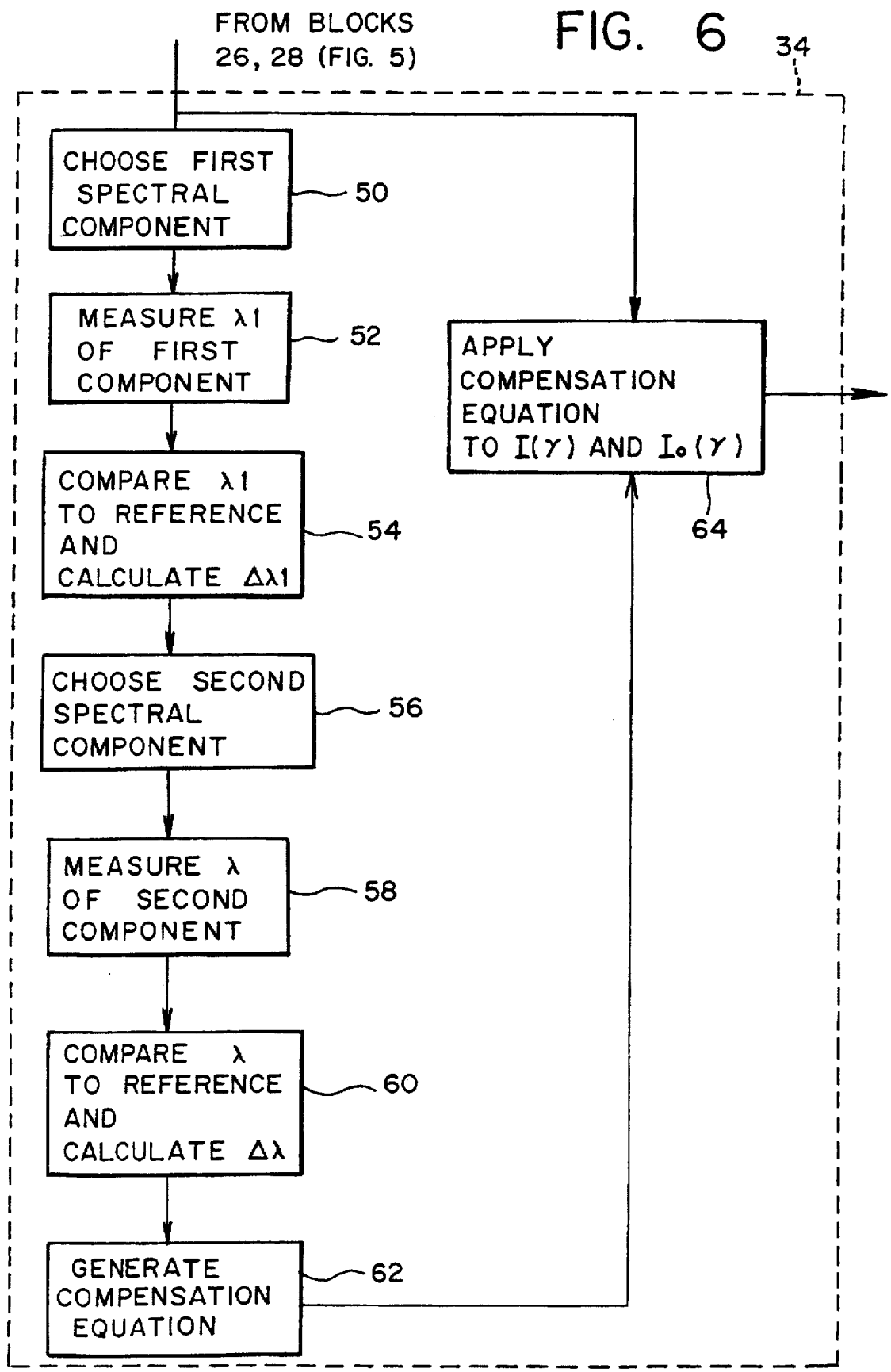
FIGS. 6 and 6a are a flow chart of the wave number shift algorithm in accordance with the present invention.
Figure 6A:
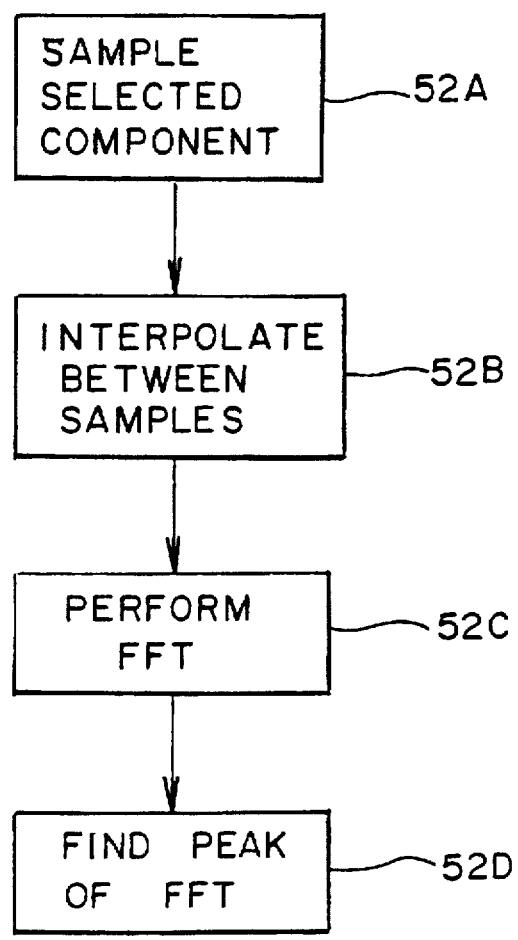

FIG. 6a illustrates the wavelength measurement step (block 52) in further detail. Preferably, this process begins with the selection of data samples (block 52a) in the region of the spectrometer bandwidth where the selected component is expected to reside. Next, additional points are interpolated (block 52b) between the data samples to improve the resolution of the data. A fast Fourier transform is then performed (block 52c) to convert the data into the frequency domain. From the transformed data, the peak of the interpolated data corresponding to the centerline wavelength of the selected component is determined (block 52d).

Returning again to FIG. 6, the measured centerline value of the selected component is then compared against the expected value for this component from a memory circuit storing a reference library, such as the HITRAN database (block 54). From this comparison, a wave number shift ($\Delta\lambda 1$) for the selected component is calculated. Since the wave number shift across the spectrometer bandwidth is expected to be linearly proportional to the wavelength, compensation factors could theoretically be approximated for the entire bandwidth by linearly scaling $\Delta\lambda 1$. For example, if at 1014 cm$^{-1}$ a shift of 0.0075 cm$^{-1}$ was found to be required, it would be expected that a shift of 0.0150 cm$^{-1}$ would be required at 2028 cm$^{-1}$ and a shift of 0.0225 cm$^{-1}$ required at 3042 cm$^{-1}$. However, this is only a first order approximation. To improve this correction approximation, the steps of selecting a component, measuring that component and comparing the measured value against a reference value is repeated for at least a second spectral line significantly separated from the first in wavelength (blocks 56–60).

In an embodiment where two points are used to calculate the compensation factors, a straight line approximation may be employed (block 62). In embodiments using multiple data points, correction factors may be more accurately established across the full bandwidth of the spectrometer using a curve fitting equation applied to these points. A polynomial curve fit is suitable for this purpose. Preferably, the compensation factors are calculated using samples of water line vapor occurring at 1014 cm$^{-1}$, 2663 cm$^{-1}$ and 4181 cm$^{-1}$.

It is also desirable to have a compensation point near the wavelength of the components expected to be measured. As an example, the water vapor line at 785 cm$^{-1}$ may also be used when the chemicals to be analyzed are members of the BTEX family (benzene, toluene, ethyl benzene, and xylenes) which exhibit spectral lines in the region of the 785 cm$^{-1}$ wavelength. The results of the compensation calculations will be used by the computer 14 to shift the measured wavelength of both the background spectrum ($I_0(v)$) and the analytical spectrum ($I(v)$) on a scan by scan basis (block 64).

Figure 7:
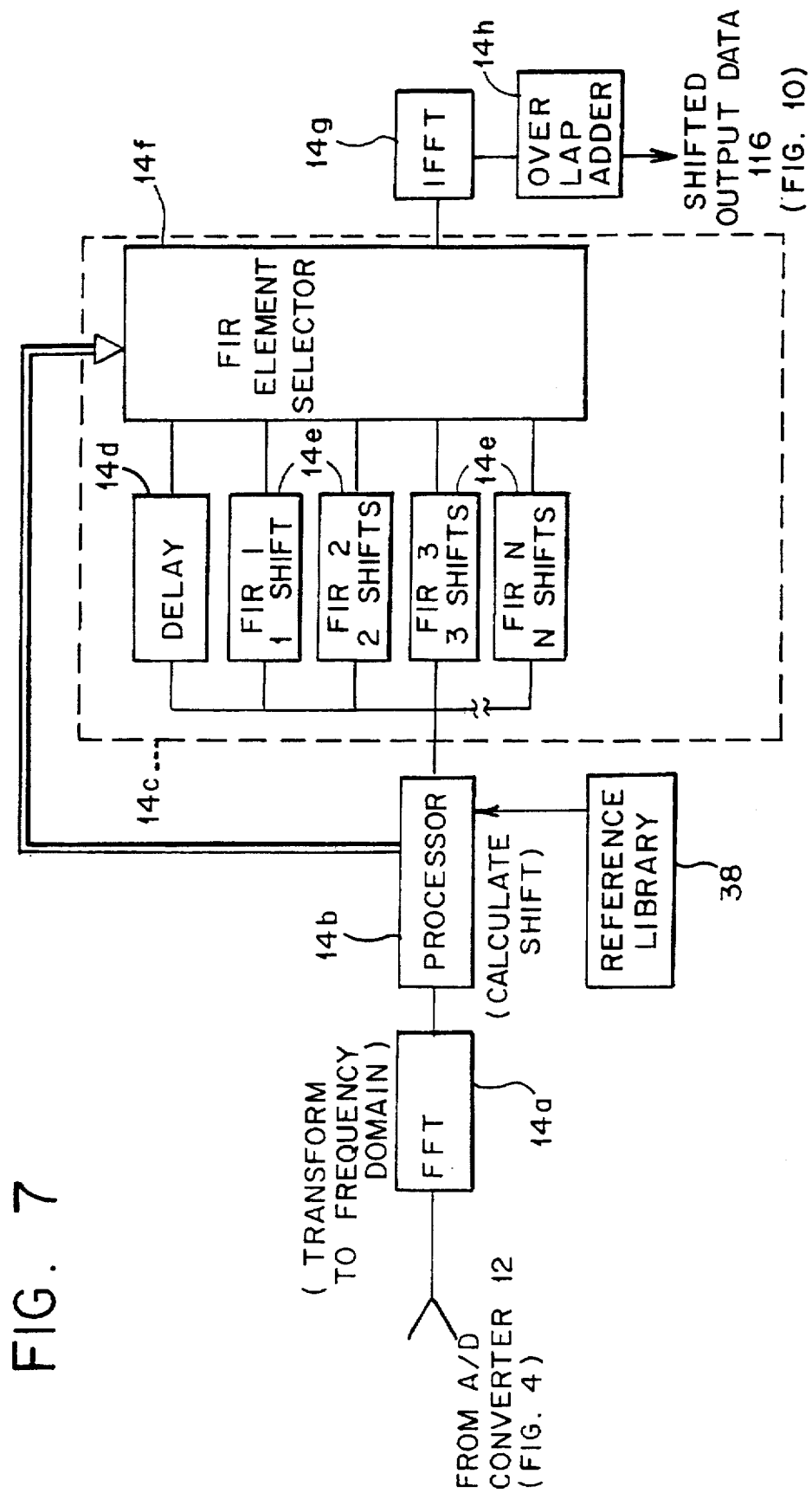
FIG. 7 is an operational block diagram of the wave number shift circuitry formed in accordance with the present invention.

FIG. 7 illustrates the finctional blocks used to implement the flow chart of FIG. 6. It should be appreciated that the elements of FIG. 7 may be within CPU 70 (FIG. 4) or formed as separate functional blocks controlled by CPU 70. The measurement step (block 52) utilizes a fast Fourier transform (FFT) circuit (or algorithm) 14a which receives sampled data from the A/D converter 12 (FIG. 4) and performs the calculations required to transform the data into the frequency domain. If phase correction (block 21) is to be performed, the FFT circuit will also perform this function. The FFT circuit 14a may take the form of a dedicated digital signal processor or digital ASIC, or may be an algorithm performed by the CPU 70 if a high speed digital signal processing type CPU is employed.

In addition to the transform function, the FFT circuit 14a also performs a data interpolation function. The digital interpolation process is needed because the number of samples within the selected water line spectrum required for direct peak determination is prohibitive, as the high resolution A/D converter that would be required would be both slow and costly. To perform the data interpolation function, the FFT circuit 14a uses sequential data points and performs a curve fitting algorithm to calculate N additional points between the measured samples. This allows for improved resolution in the output data without the need for high resolution A/D converters. Also, as interpolation is faster than sampling, this process improves the real-time performance of the system. For example, in a system with an A/D sampling resolution of 0.24 cm$^{-1}$ and an FFT interpolation rate of 31 points between samples (1:32), the interpolated resolution of the spectrometer improves to 0.0075 cm$^{-1}$. This expanded, interpolated data set is then used to determine the peaks in the measured spectrum. While it is possible to perform this interpolation on the entire set of sampled data, this is unnecessary and will reduce the processing speed of the system. As the interpolated data is only used in the peak determining process, only a subset of the data clustered around each of the expected peaks needs to be expanded by the interpolation process.

To calculate the $\Delta\lambda$ for each of the selected water vapor lines, a processing circuit 14b within the computer 14, or as a separate component, is employed. Typically, the processing circuit 14b is part of the central processing unit (CPU) 70, as illustrated in FIG. 4. However, other dedicated processors may also be used to perform this function. The processing circuit 14b receives both the interpolated data from the FFT circuit 14a and stored data from a reference library 38. The reference library 38 includes values indicating the expected peak wavelength of the selected elements. The reference library 38 may be stored in any conventional non-volatile memory or storage device such as magnetic disk, magnetic tape, read only memory integrated circuits (ROM), or read only optical disk. FIG. 4 illustrates the embodiment of the present invention wherein the reference library is contained in ROM 76.

The difference in wavelength between the peak of the experimental data and the peak of the reference data is determined for each selected "universally present" and is expressed as the number of interpolated data points between these two wavelengths. These values, which are to be used in the subsequent shifting process 64 (FIG. 6), will be integer numbers in the range of the interpolation rate of the FFT 14a. This process is graphically illustrated in FIG. 8. In this figure, the sampled data is shown expanded with four interpolated data points between samples. A reference peak, $\lambda_r$, which is read from the memory circuit 76 storing reference library 38, is shown separated from the interpolated peak, $\lambda_i$, by one interpolated data point. This quantity is stored for use in the subsequent shifting process.

Figure 9:
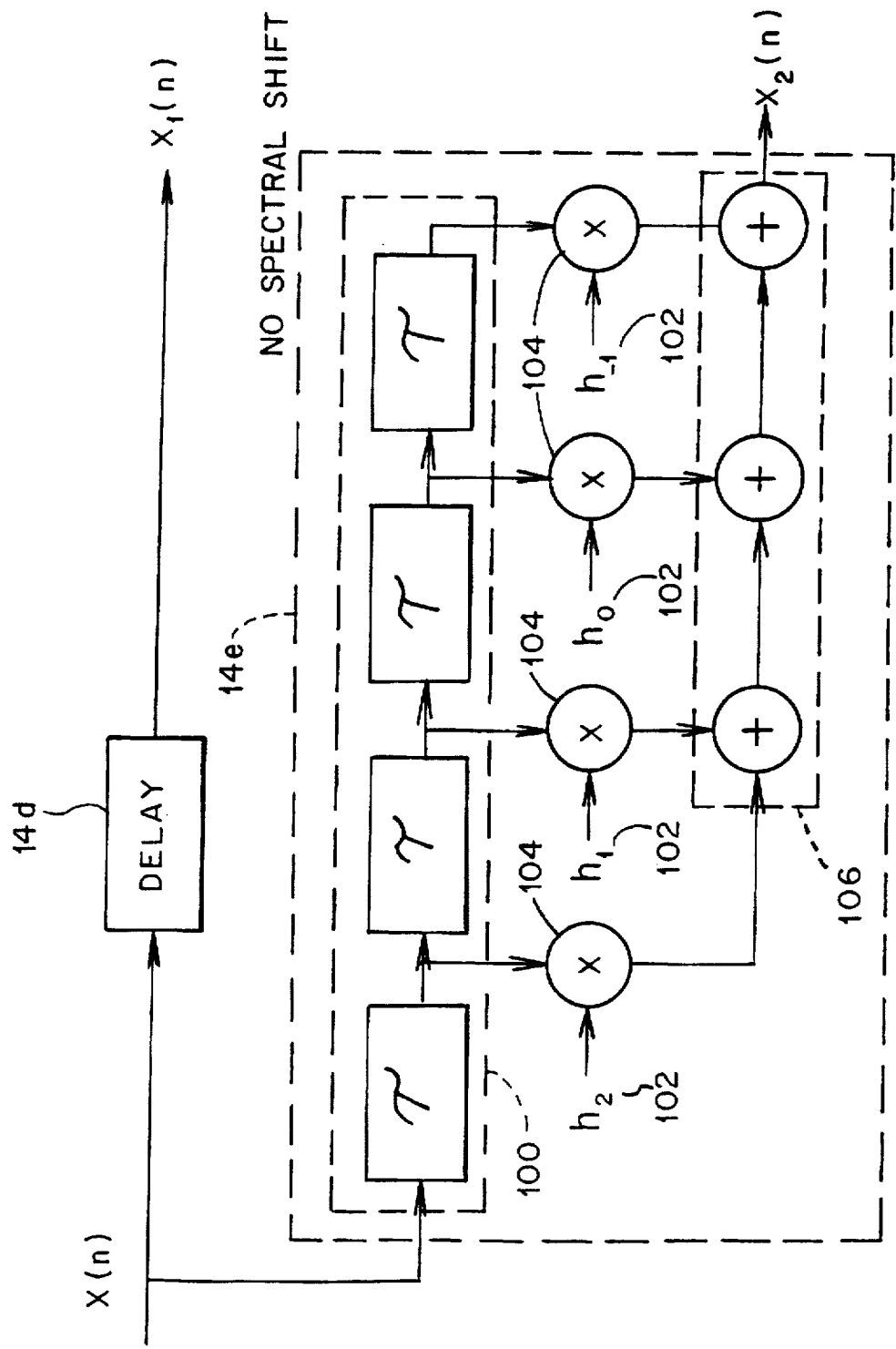
FIG. 9 is a block diagram of a finite impulse response filter element used in the present invention.

The actual process of shifting the single beam spectrum is performed using a finite impulse response (FIR) filter block having a time delay element 14d and a series of FIR filter elements 14e. These elements are further illustrated in FIG. 9. The required number of filter elements within the filter block is equal to N, where N is the interpolation rate employed by the FFT in determining the centerline peaks. Each filter element 14e includes a delay line 100 which receives the input data and passes it through N delay outputs. Each of the N delay outputs are coupled to one of N mixer elements 104 such that the mixer elements 104 receive the delay input signal. Further, the FIR filter elements 14e are designed with a set of N coefficients 102. The coefficients 102 are applied to each of the N mixer elements 104 which apply the coefficients to the delayed input data and generate N mixer output signals. The N mixer output signals are combined by a summing circuit 106 which receives and combines the N mixer output signals to perform a specific integer shift on the input data signal corresponding to that filter element 14e. As illustrated in FIG. 7, the delay element 14b performs no shift, FIR1 performs a single shift, FIR 2 performs two shifts, up to FIR N which performs N shifts on the input data.

Figure 8:
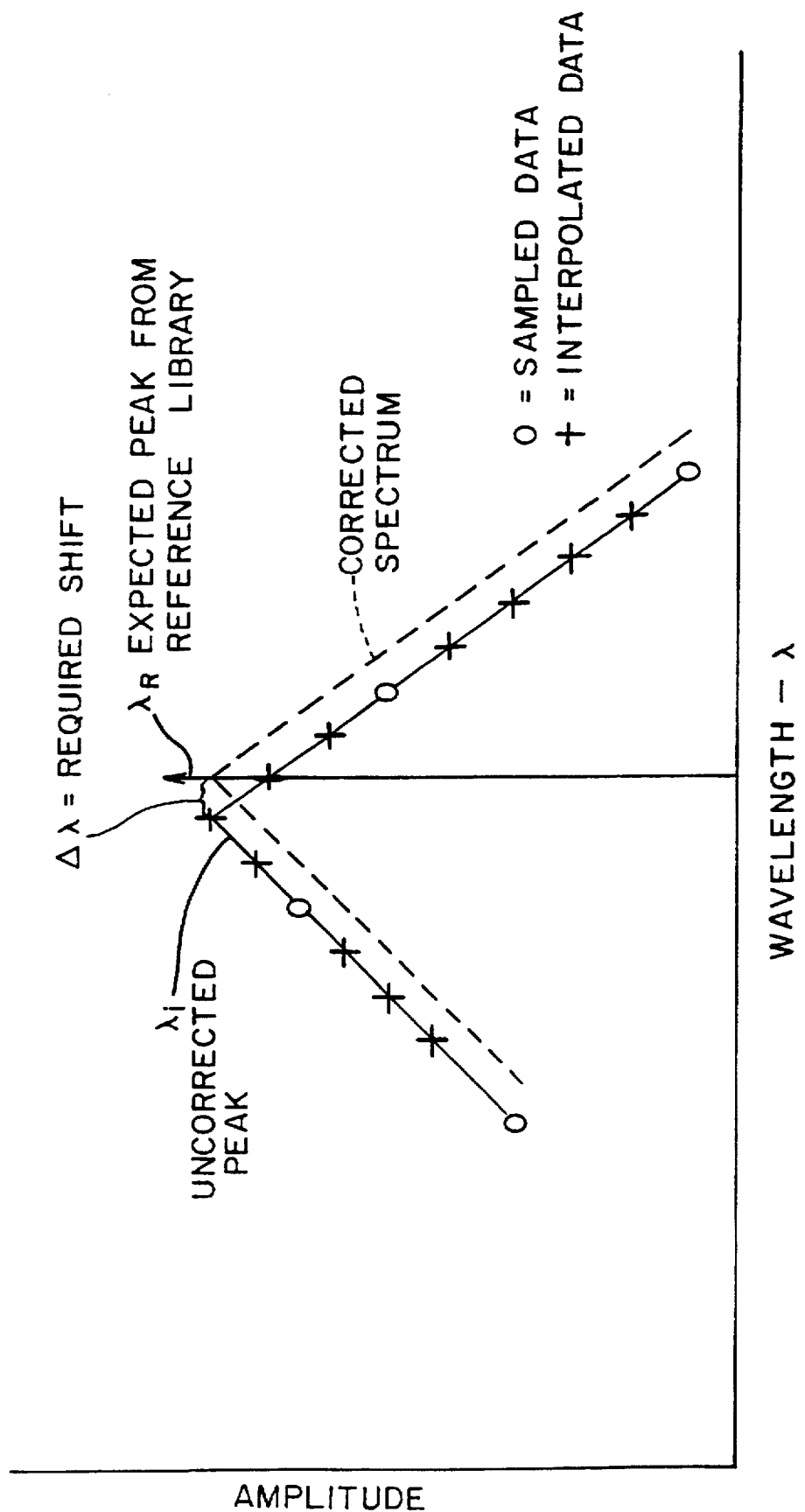
FIG. 8 is a spectral graph of magnitude versus wavelength for an interpolated single beam spectrum.

The single beam spectrum 24 is illustrated in FIG. 8 as an amplitude versus wavelength line graph. This line graph is actually composed of a series of closely spaced data samples stored within a temporary storage memory unit 72 (FIG. 4) of computer 14. Each sample stored in memory has an address and value associated to it. As FIG. 8 illustrates, each address corresponds to a specific wavelength in the single beam spectrum, and the value stored at this address in memory represents the magnitude of the signal at that wavelength. The number of wave number shifts required to compensate the measurements of the spectrometer is a slowly changing function with wavelength. As a result, the shift that is required to correct each discrete data sample will likely be the same as that required for the adjacent sample. Therefore, it is convenient to group the input data into segments representing a portion of bandwidth to which to apply one of the N shift values.

An FIR selector 14f (FIG. 7) receives the compensation factor data from the processor 14b and selects the appropriate FIR filter element to apply to each segment of the bandwidth by estimating the integer value most closely matching the compensation factors for the samples in that segment. So long as the segment size is kept small with respect to the overall bandwidth of the spectrometer, this integer approximation will result in accurate correction of the samples within the segments. In this way, only one of the N FIR filter elements 14e needs to be active for any given bandwidth segment. It should be appreciated that the FIR filter and selection functions may also be implemented in software. In this embodiment, rather than physically selecting one of N hardware filter elements 14e as shown in FIG. 7, the FIR selector 14f chooses coefficients 102 (FIG. 9) from a look-up table stored in EAROM 74 (FIG. 4) for use in an FIR filter algorithm.

Figure 10:
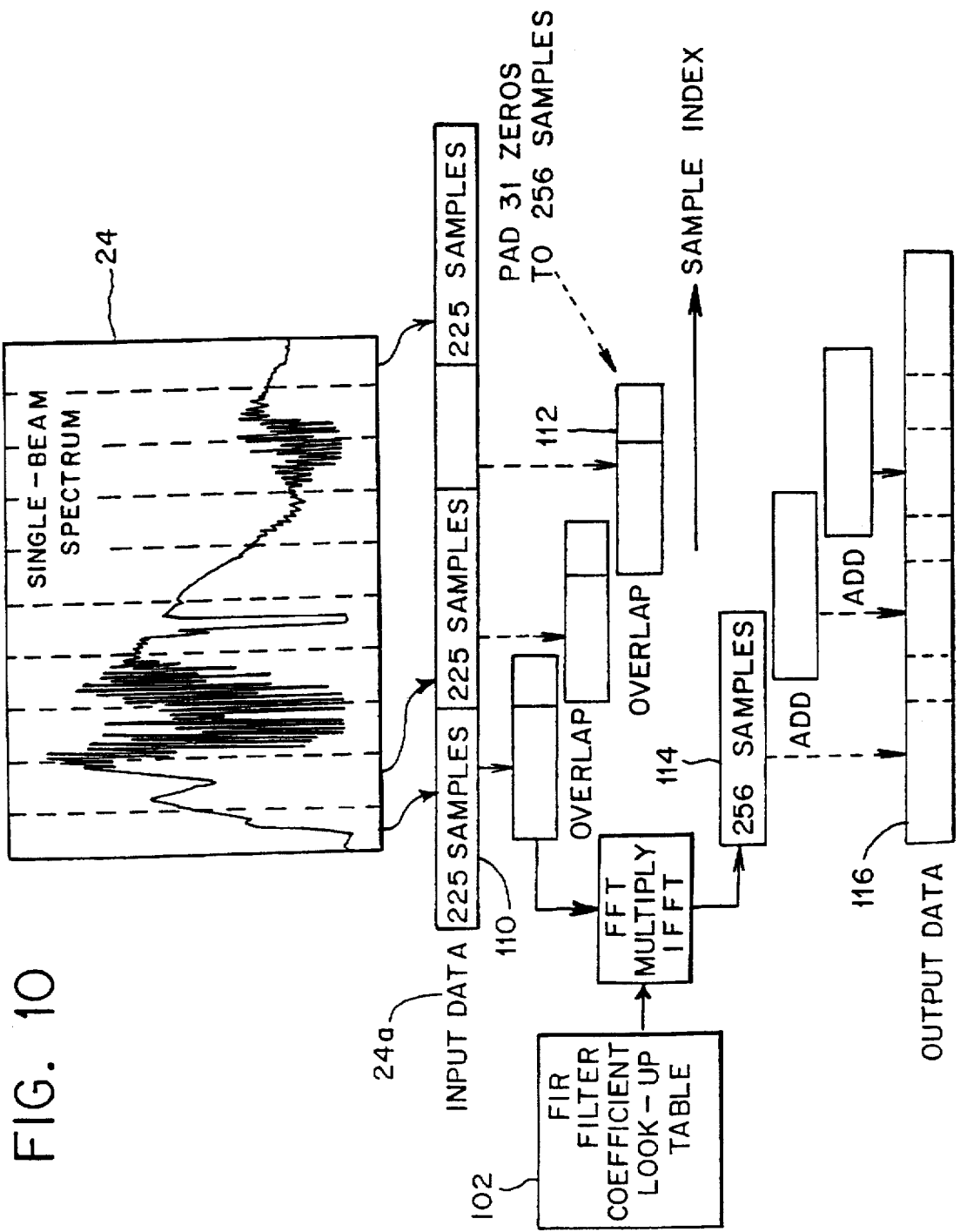
FIG. 10 is a block diagram which graphically illustrates the overlap and add algorithm used to perform wave number shifting in accordance with the present invention.

In a preferred embodiment, the function employed to shift the segmented bandwidth is an overlap and add convolution illustrated in FIG. 10. The overlap and add convolution is discussed in Chapter 8 of the "Handbook of Digital Signal Processing," written by F. J. Harris and edited by D. F. Elliott, published by Academic Press, copyright 1987, which is incorporated by reference. In the preferred embodiment of the present invention, for each segment of the spectrometer bandwidth, the FIR selector 14f uses the look-up table to select the coefficients 102 (FIG. 9) of an FIR filter required to correct that segment. The CPU 70 then applies the corresponding response from the filter coeffients 102 (FIG. 9) to each of the data segments to perform the required shifting function. In a preferred embodiment of the present invention, each segment of input data contains 225 data samples (block 110). To this data segment, 31 zero-value samples (block 112) are appended to extend the length of the working sample to 256 samples. The working sample is then multiplied, sample by sample, by the response of the selected FIR filter coefficients 102. The resulting frequency domain product then undergoes a 256-sample inverse FFT, resulting in a 256 shifted sample segment in the time domain (block 114).

To complete the process and result in a correct full bandwidth data stream, each of the subsequent 256 sample outputs are sequentially passed through an overlap-adder function in CPU 70. This function aligns the 31 most significant samples of a current corrected output segment to overlap the 31 least significant samples of the previous corrected output segment and then adds the two segments together as shown. This process is then repeated for all data segments in the spectrometer bandwidth. In this way, the output data (block 116) is restored to the full length of the original input data (block 24a), and corrected with the required wave number shifts.

By segmenting the bandwidth and processing it in small blocks, it is possible to apply band-segment specific shifts in a very time efficient manner. Alternatively, the frequency response of the entire bandwidth could be convoluted with the correction function calculated for the entire bandwidth in a single process. However, the convolution of two such large functions requires a great deal of computer processing power and is not time efficient.

After both the background spectrum ($I_0(v)$) and analytical spectrum ($I(v)$) have been shifted according to the above-described process, the absorption spectrum can be calculated, as shown in Blocks 30 and 32 (FIG. 5) by implementing the equation:

$$\text{Absorption spectrum} = -\log_{10}\left[\frac{I(v)}{I_0(v)}\right]$$

Once the absorption spectrum has been calculated, classical least squares regression analysis may be employed to calculate the concentration of the elements of interest (block 36). The result is a quantitative analysis output (block 40) suitable for human or machine evaluation.

It will be appreciated by those skilled in the art that a Fourier transform infrared spectrometer performing the real-time wave number shift algorithm of the present invention matches the wavelength of spectral components detected by the spectrometer on a scan-by-scan basis. This correction is performed by carrying out two time-efficient signal processing functions to determine the peak of water vapor lines, compare these peaks to a reference library, calculate the amount of shift required across the bandwidth, and perform an overlap and add convolution to implement the required shifts. It will be further appreciated that the present invention thereby minimizes the differential error previously encountered in conventional methods and systems when comparing a shifted measured signal against a non-shifted reference signal. In this way, the present invention provides for enhanced measurement sensitivity of chemical species within a measurement path due to reduced error incurred from wave number shifts.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method for improving the sensitivity of an open-path Fourier Transform Infrared Spectrometer by performing a corrective wave number shift on the spectrum of elements to be analyzed within a bandwidth of the spectrometer, the wave number shift method comprising the steps of:

a) selecting a first known component in a measurement path of a spectrometer;

b) measuring the wavelength of the first selected component;

c) determining the magnitude of the wave number shift of the first selected component by comparing the measured wavelength of the first selected component to the wavelength of a reference standard for the first selected component;

d) selecting a second known component in the measurement path of the spectrometer, the second known component having a wavelength different from the first selected component;

e) measuring the wavelength of the second known component;

f) determining the magnitude of the wave number shift of the second known component by comparing the measured wavelength of the second known component to the wavelength of a reference standard for the second known component;

g) partitioning the bandwidth of the spectrometer into a series of data segments, the data segments being contiguous across the spectrometer bandwidth;

h) generating a wave number shift correction factor for each segment of the bandwidth from the wave number shifts determined in steps a) through f); and j) correcting each segment of subsequent spectrometer samples prior to concentration analysis by shifting the measured wavelength of the subsequent spectrometer samples in accordance with the wave number shift correction factors determined in step h).

2. A method as defined by claim 1, wherein steps d)–f) are repeated for at least a third known component prior to performing step g).

3. A method as defined by claim 1, wherein:

the first known component selected in step a) is a water vapor line occurring at 1014 $cm^{-1}$; and the second known component selected in step d) is a water vapor line occurring at a wavelength which is at least one of 785 $cm^{-1}$, 2663 $cm^{-1}$ and 4181 $cm^{-1}$.

4. A method as defined by claim 1, wherein each of steps b) and e) further includes the steps of:

aa) digitally sampling an interferogram generated by the spectrometer;

bb) creating an expanded data set by performing digital interpolation between the samples of step aa);

cc) transforming the expanded data set into a frequency domain, single beam spectrum by performing a Fourier transform on the expanded data set; and dd) determining the peak of the single beam spectrum.

5. A method as defined by claim 1, which further comprises the steps of:

i) developing a synthetic background spectrum before performing step a);

ii) performing a corrective wave number shift on the background spectrum by applying step f) to the background spectrum;

iii) after step f), generating a transmission spectrum by dividing the shifted spectrometer samples from step f) by the shifted synthetic background spectrum developed in step ii);

iv) generating an absorption spectrum from the transmission spectrum by taking the negative logarithm of the transmission spectrum; and v) calculating the concentration of chemical elements in a measurement path by performing a classical least squares analysis on the transmission spectrum.

6. A method as defined by claim 1, wherein:

the correction factors of step h) comprise coefficients of a plurality of finite impulse response filters stored in a look-up table, the look-up table matching each data segment to a corresponding finite impulse response filter; and wherein step j) further includes the steps:

1) selecting the first data segment of the spectrometer bandwidth;

2) searching the look-up table to determine the appropriate finite impulse response filter for the selected data segment;

3) applying the finite impulse response filter to the selected data segment to perform the required wave number shift; and 4) repeating steps 1), 2) and 3) for each segment in the spectrometer bandwidth.

7. A method as defined by claim 6, wherein step 3) further comprises performing an overlap and add convolution to apply the finite impulse response filter to the selected data segment to perform the required wave number shift.

8. A method as defined by claim 7, wherein each of the selected data segments contains 225 data samples and further includes thirty-one, zero-value samples appended to the 225 data samples to form a 256 point segment to be processed in the overlap and add convolution step.

9. An open-path Fourier transform infrared spectrometer for measuring the concentration of chemical elements in an environment, the spectrometer including a digitally sampled interferogram and being capable of performing real-time, wave number shifting of the sampled interferogram to improve detection sensitivity, the spectrometer comprising:

a real-time shifting circuit, the real-time shifting circuit including:

a central processing unit receiving the digitally sampled interferogram, the central processing unit performing a fast Fourier transform on the interferogram to convert the interferogram into a single beam spectrum;

a read only memory containing a reference library with the wave number characteristics of known spectral elements expected to reside in an environment to be sampled, the read only memory being electrically coupled to the central processing unit such that the central processing unit can select and retrieve the contents of the reference library and compare these contents to the single beam spectrum, whereby correction factors for the single beam spectrum may be calculated; and an electrically alterable memory, the electrically alterable memory being electrically coupled to the central processing unit such that the central processing unit can both write to and read from the electrically alterable memory, the central processing unit writing a look-up table in the electrical alterable memory comprising the correction factors for the single beam spectrum, the central processing unit selectively recalling the correction factors from the table and performing a wave number shift on subsequent digitally sampled interferograms, whereby the wavelength of the sampled interferograms is aligned to minimize errors in subsequent processing.

10. An open-path Fourier transform infrared spectrometer for measuring the concentration level of a chemical species in an environment, the spectrometer including a digitally sampled interferogram and being capable of performing real-time, wave number shifting of the sampled interferogram to improve detection sensitivity, the spectrometer comprising:

a real-time shifting circuit, the real-time shifting circuit including:

fast Fourier transform (FFT) means, the FFT means receiving the digitally sampled interferogram and generating a frequency domain single-beam spectrum signal therefrom;

mathematical processor means, the mathematical processor means being electrically coupled to the FFT means to receive the single-beam spectrum signal therefrom;

a read only memory containing data comprising a reference library with the wave number characteristics of spectral elements expected to reside in an environment, the read only memory being electrically coupled to the mathematical processor means such that the mathematical processing means can selectively retrieve the data from the reference library and compare this data to the single beam spectrum signal, whereby correction factors for the single beam spectrum signal may be calculated;

a plurality of finite impulse response (FIR) filter elements, each FIR filter element being electrically coupled to the FFT means to receive the single beam spectrum signal, each FIR filter element performing one of a plurality of assigned integer wavelength shifts on the single beam spectrum signal to thereby generate a plurality of shifted single beam spectrum signals, the assigned wavelength shifts being determined by the calculated correction factors;

an FIR filter element selector; the FIR filter element selector receiving the plurality of shifted single beam spectrum signals from each of the plurality of FIR filter elements and selecting one of the shifted single beam spectrum signals to implement the required wave number shift;

inverse fast Fourier transform means, the inverse fast Fourier transform means being electrically coupled to the FIR filter element selector, the inverse fast Fourier transform means receiving the selected shifted single beam spectrum and converting the selected shifted single beam spectrum into a shifted time domain interferogram;

and classical least squares regression analysis means responsive to the inverse fast Fourier transform means, the classical least squares regression analysis means receiving the shifted time domain interferogram and calculating a concentration level of a chemical species in the measurement path of the spectrometer.

* * * * *